Nov. 9, 1937.   J. W. TATTER   2,098,681
BRAKE
Original Filed May 12, 1932   2 Sheets-Sheet 1
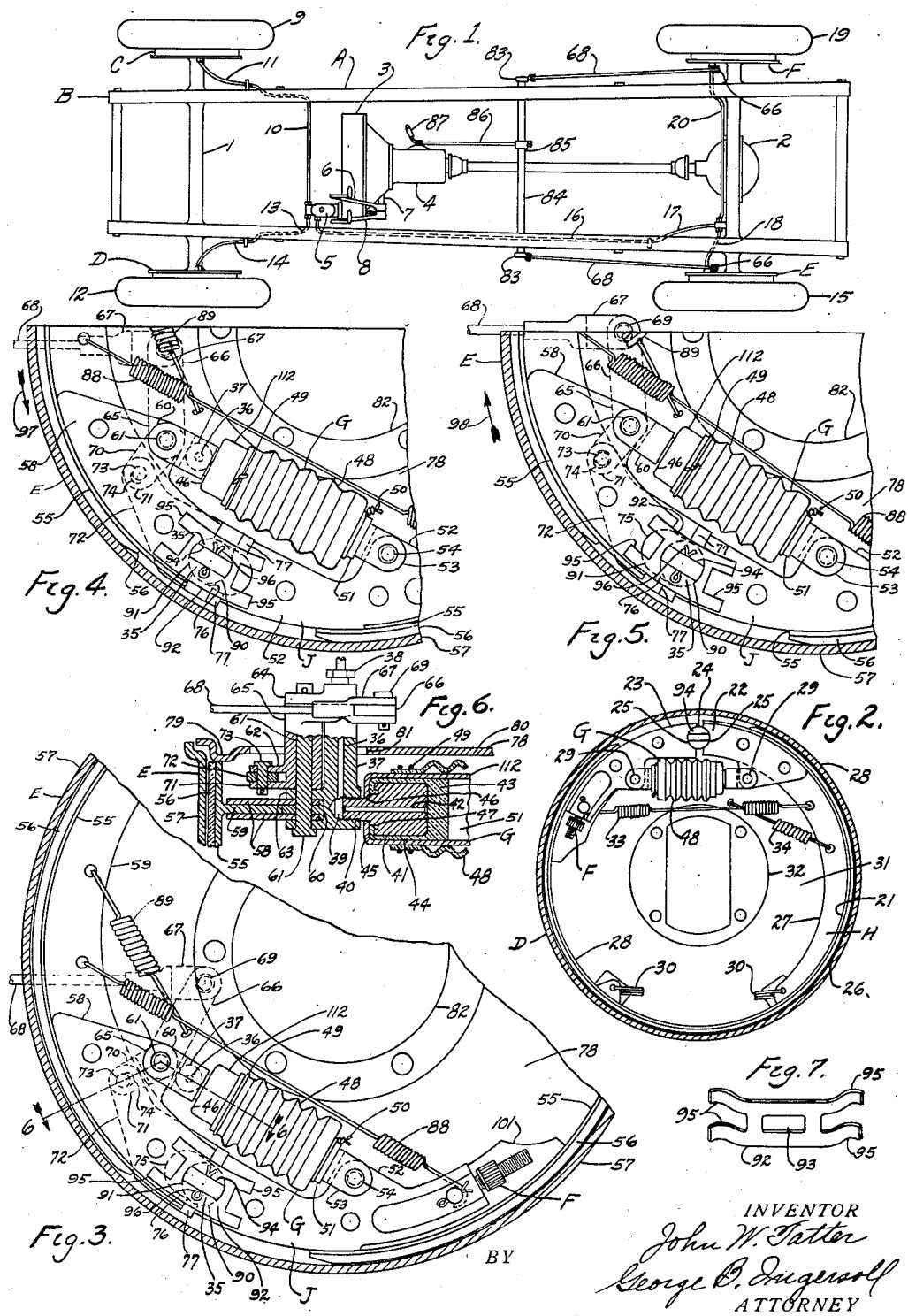
INVENTOR
John W. Tatter
BY George B. Ingersoll
ATTORNEY

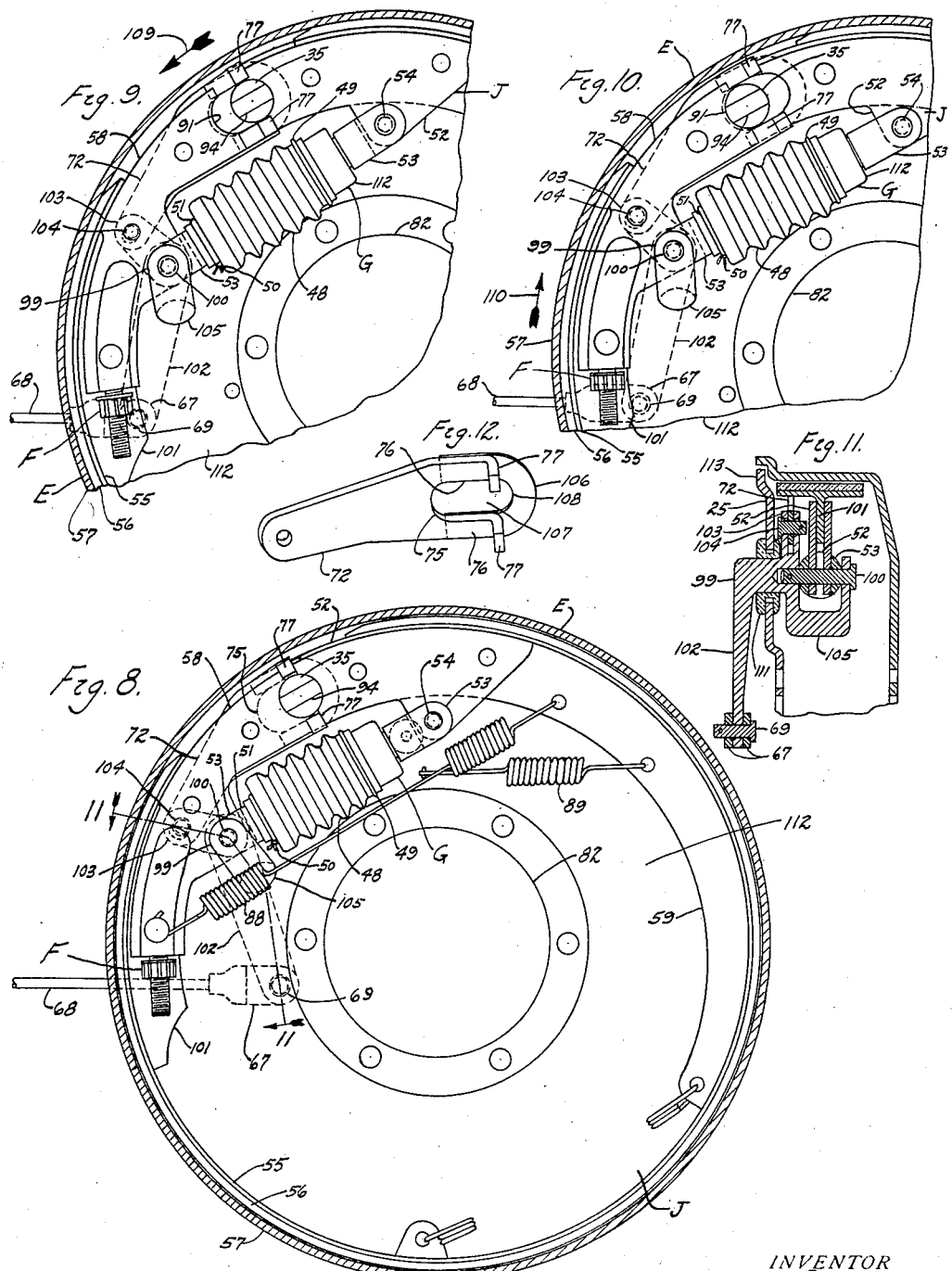

Patented Nov. 9, 1937

2,098,681

UNITED STATES PATENT OFFICE 2,098,681

BRAKE

John W. Tatter, Detroit, Mich., assignor to Bendix Products Corporation, South Bend, Ind., a corporation of Indiana Application May 12, 1932, Serial No. 610,827
Renewed April 19, 1937

20 Claims. (Cl. 188—106)

My invention relates to improvements in brakes for automotive vehicles in which the brakes are operated by hydraulic pressure; and the objects of my improvements are, first, to provide a hydraulic brake that can be operated by means independent of the hydraulic operating mechanism; second, to provide a brake mechanism that can be operated both as a service and as an emergency brake; third, to provide an emergency brake which has, for a given travel movement of its operating brake rod member, a greater operating leverage when the vehicle to which it is attached, is moving in a forward direction than when said vehicle is moving in a reverse direction; fourth, to provide a full wrapping hydraulic brake having maximum self-energizing characteristics when the vehicle to which it is attached is moving in either a forward or a reverse direction; fifth, to provide a brake mechanism having a shoe member held against a backing plate by a resilient spider member; sixth, to provide a brake mechanism having especially well equalized and easy operating characteristics; seventh, to provide a wheel brake mechanism having an operating lever located in such position as to neutralize the vertical movement of the operating lever due to the travelling movement of the motor vehicle to which the brake mechanism is attached; eighth, to provide a brake mechanism having an operating lever connected with a hydraulic wheel cylinder; ninth, to provide a brake shoe member operated by a member engaging both of the end surfaces of its end portions; tenth, to provide a brake shoe member having an anchor pin engaged by the operating member for the brake shoe member.

I attain these objects by the mechanism illustrated in the accompanying drawings, in which—

Figure 1 is a plan view of an automotive vehicle incorporating my brake; Fig. 2, a side elevation of one of the front wheel brakes with a vertical section of the brake drum together with the spider spring member removed; Fig. 3, a partial sectional view of the left rear wheel brake assembly in its disengaged or off position; Fig. 4, a partial sectional view of the left rear wheel brake assembly in its engaged position when the vehicle is moving in a forward or ahead position; Fig. 5, a partial sectional view of the left rear wheel brake assembly in its engaged or on position when the vehicle is moving in a rearward or reverse direction; Fig. 6, a partial sectional view of the wheel cylinder and operating mechanism on the line 6—6, Fig. 3; Fig. 7, a perspective of one of the spider springs; Fig. 8, a side elevation of a preferred left rear wheel brake assembly in a disengaged or off position and with a vertical section of the brake drum; Fig. 9, a partial sectional view of the left rear wheel brake assembly in its engaged or on position when the vehicle is moving in a forward or ahead position; Fig. 10, a partial sectional view of the left rear wheel brake assembly in its engaged or on position when the vehicle is moving in a rearward or reverse position; Fig. 11, a partial sectional view of the wheel cylinder operating mechanism on the line 11—11, Fig. 8; and Fig. 12, a perspective of the link member which connects the hand brake operating mechanism with the anchor pin of the brake shoe assembly.

Similar numerals refer to similar parts throughout the several views.

In Fig. 1, the automotive vehicle A is disclosed as comprising the frame assembly B to which is suitably attached the front axle assembly 1 and the rear axle assembly 2. The rear motor support member 3 is indicated in a conventional position relative to the vehicle, the rear motor support member 3 being suitably supported from the crankcase and cylinder portions (not shown) of a conventional assembly. The transmission 4 may be mounted, in a conventional way, on the rear motor support member 3. The master cylinder 5 may be suitably mounted on the rear motor support member 3 and may be connected, by means partly shown, to the brake pedal 6 which is suitably mounted on the clutch throwout shaft 7, the clutch pedal being disclosed at 8. The master cylinder 5 is connected to the brake assembly C, in the right front wheel 9, by the conduits 10 and 11, the master cylinder 5 being further connected to the brake assembly D in the left front wheel 12 by the conduits 13 and 14. The master cylinder 5 is further connected to the brake assembly E in the left rear wheel 15 by the conduits 16, 17 and 18, and further to the brake assembly F in right rear wheel 19 by the conduit 20.

The liquid of the hydraulic system will be distributed from the master cylinder 5, when the brake pedal 6 is depressed, through the above mentioned conduits to the four brake assemblies in the four wheels.

In Fig. 2 is disclosed the construction of one of the front wheel brake assemblies in which the brake shoe 21 is suitably anchored at its open ends by the members 22 and 23 engaging with the anchor pin 24 which may be suitably mounted in the backing plate 31, the end members 22 and 23 of the brake shoe 21 being provided with semi-circular surfaces 25 for engaging the anchor pin 24. The end members 22 and 23 are suitably fastened to the ends of the brake shoe 21, the brake shoe 21 being provided with the web portion 27 which provided greater rigidity in the rear portion of the brake shoe 21, the front and central lower portion of the brake shoe 21 being provided with the rectangular section 28 having its outer surface extending circumferentially of the brake drum 28 disclosed in section in Fig. 2. The brake shoe 21 is provided with the brake lining 26 together with the springs 30 for returning the brake shoe assembly to a disengaged position relative to the brake drum 28, the springs 30 being suitably connected to the brake shoe 21 and to the backing plate 31, the backing plate 31 being suitably fastened to the flange 32 of the front axle assembly 1.

The adjusting mechanism F, as disclosed in Figs. 2, 3, 8, 9 and 10 is similar to that described in my application for Brake Serial No. 564,085, filed Sept. 21, 1931, and forms, in its specific construction, no part of my present invention.

The springs 33 and 34 may be provided for maintaining the semi-circular surfaces 25 in engagement with the anchor pin 24 when the brake shoe assembly H is in a disengaged position relative to the brake drum 28.

It is to be noted, however, that in Fig. 2, the hydraulic wheel cylinder G is pivotally connected and supported respectively at its ends 29 to the end members 22 and 23, the wheel cylinder G thus being supported on the brake shoe assembly H in a position below the anchor pin 24, the anchor pin 24 being located approximately at the central upper portion of the brake assembly D as disclosed.

The hydraulic wheel cylinder G as disclosed in the front wheel brake assembly D in Fig. 2 and hereinafter described in connection with the rear wheel brake assembly E, as disclosed in Figs. 3, 4, 5, 6, 8, 9 and 10 is similar to that disclosed and claimed in my application for Brake Serial No. 388,585, filed Aug. 26, 1929, and forms, in its specific construction, no part of my present invention.

In Figs. 3, 4 and 5, the anchor pin 35 is located approximately at the lower side of the wheel brake assembly E and in a position ahead of the vertical center line of the wheel brake assembly E.

As the hydraulic liquid is forced through the hydraulic system from the master cylinder 5, the hydraulic liquid will enter the wheel cylinder 112, through the connection 38, and the passage 36 of the nut 37, the hydraulic liquid further passing into the chamber 39, at the end of the threaded end 40 of the member 41, and through the passage 42 of the member 41. As the hydraulic liquid passes through the passage 42, it will force the thick wall 43 of the piston seal 44 along the cylinder 112. The piston seal 44 is constructed of resilient or elastic material, such as rubber composition, and is provided with a relative thin cylindrical wall extending around the member 41, the relative thin cylindrical wall portion connecting the thick wall 43 with the flange portion 45, which is suitably fastened to said member 41 and is further held in its operating position by being clamped between the member 41 and the end wall 46, the piston seal 44 being still further held in securement by the shoulder portion 47 fitting within similarly shaped recesses of the member 41. The cylinder 112 is enclosed by the convoluted rubber member 48 which is secured by the wires 49 and 50. The cylinder 112 encloses the piston 51 which is slidably mounted therein and is further pivotally connected to member 52 by the yoke 53 and the pin 54, the member 52 being suitably attached to the brake shoe 55 which in turn is provided with the brake lining 56 for engaging the brake drum 57.

The member 58 is suitably attached to the other end of the brake shoe 55 and to its web portion 59, the brake shoe being suitably equipped with the adjusting mechanism F. The member 58 engages the yoke 60 of the nut 37 and is pivotally connected therewith by the pin 61.

It is to be noted that the nut 37 is further provided with the yoke 62, the wall portion 63 of the yoke 61 forming also the inner wall of yoke 62, the outer wall of said yoke 62 being indicated at 64. The pin 61 also pivotally connects the double end lever 65 with the walls 63 and 64 of the yoke 62 of the nut 37, the double end lever 65 being movably mounted between the walls 63 and 64. The double end lever 65 has its upper lever arm 66 pivotally connected to the yoke 67 of the brake rod 68 by the pin 69. The lower lever arm 70 is provided with the yoke portion 71 which is pivotally connected with the link 72 by the pin 73.

It is to be noted that the yoke portion 71 of the lower lever arm 70 is provided with the elongated hole 74 which allows the double end lever 65 to rotate about the pin 73 without tending to move the end of the brake shoe 55 and the member 58 together with the brake lining 56 away from the brake drum 57 as would be the case if the pin 61 was allowed to move along a true arc relative to the pin 73.

The link 72, as disclosed in Fig. 12, is provided with a semi-circular surface 75 together with a pair of arms 76 thereadjacent, the arms 76 having their ends 77 formed to extend approximately at right angles with the arms 76. The semi-circular surface 75 of the link 72 is adapted to clear the anchor pin 35, the arms 76 being adapted to extend along and between the inner side of the brake shoe 55 and the inside surface 80 of the backing plate 78 which is provided with the offset portion 79, as disclosed in Fig. 6, to allow the link 72 to slidably operate between the inside surface 80 and the inner edge of the brake shoe 55. The backing plate 78 is further provided with the opening 81 through which extends the nut 37 and the double end lever 65, the opening 81 being of sufficient size to allow the nut 37 and the double end lever 65 to move therein without interference in its oscillating travel movement. The backing plate 78 is suitably fastened to the flange 82 of the rear axle assembly 2.

The brake rods 68 are suitably connected to the levers 83 which are mounted on the cross shaft 84 which, in turn, is suitably supported on the frame assembly B. The lever 85 is suitably mounted on the cross shaft 84 and is suitably connected to the brake rod 86 which, in turn, is suitably connected to the emergency hand brake lever 87, which is mounted on the transmission 4. The springs 88 and 89 may be provided for maintaining the respective semi-circular surfaces 90 and 91 of the members 52 and 58 in engagement with the anchor pin 35 when the brake shoe assembly J is in a disengaged position relative to the brake drum 57.

The spider spring 92, as disclosed in perspective in Fig. 7, is provided with the opening 93 through which extends the projection 94 formed on the outer end of the anchor pins 35 and 24, the spider spring 92 being assembled so that its arms 95 will bear against the outer sides of the end members 22 and 23 of brake shoe assembly H and the end members 52 and 58 of the brake shoe assembly J, the spider spring 92 being retained on the projection 94 by the cotter pin 96. The spider spring 92 is constructed of suitable resilient material so that the arms 95 will always exert a pressure against the sides of the brake shoe assemblies H and J and so thus oppose and counteract any transverse thrust load that may be developed by the operation of the link 72 against the ends of the brake shoe assemblies H and J.

As the hydraulic liquid is forced through the passage 42 of the member 41, the hydraulic liquid will force the thick wall 43, of the piston seal 44, away from the nut 41 and against the piston 51, the relative thin cylindrical wall, connecting the thick wall 43 with the flange portion 45, easily stretching to allow for the movement of the thick wall 43 along the cylinder 112, and forming a perfect and closed seal for the hydraulic liquid around the member 41 and within the cylinder 112. As the piston 51 is thus moved by the force of the hydraulic liquid, both front ends of the shoe assemblies will move into engagement with the drums.

Fig. 3 discloses the brake shoe assembly J in a disengaged or neutral position relative to the brake drum 57, the semi-circular surfaces 90 and 91, of the members 52 and 58 of the brake shoe assembly J, being held in engagement with the anchor pin 35 and the ends 77, of the link 72, in engagement with both ends of the brake shoe assembly J, the link 72 being thus held in an anchored position.

When it is desired to use the wheel brake assembly J as an emergency brake, operated by the hand brake lever 87, the brake assembly J will assume the position disclosed in Fig. 4, if the motor vehicle is moving in a forward or ahead direction. When the emergency hand brake lever 87 is operated, the brake rod 86, the lever 85, the cross shaft 84, the levers 83, together with the brake rods 68 and yokes 67 will cause the upper arm 66 of the double arm lever 65 to move forwardly, this causing the double arm lever 65 to pivot around pin 61, thus pushing the link 72 in the direction of the arrow 97 and in turn with end 77 of link 72 will move the front end of the shoe 55 into engagement with the drum. The reason for this movement is that the spring 89 tends to hold the rear end of the shoe 55 against the anchor pin 35, Fig. 3.

It is thus to be noted that my invention will provide a simple and efficient emergency hand brake mechanism that can be applied to the wheel brake mechanism of a hydraulic brake system and to any brake system employing a single brake shoe member operating in a brake drum.

Fig. 5 discloses the position of the various operating parts when the emergency hand brake is operated with the motor vehicle moving in a rearward or reverse direction, the wheels 15 and 19 together with the brake drum 57 then moving in the direction of the arrow 98, in Fig. 5. As the upper arm 66, of the double arm lever 65, is moved forward by the operator applying the emergency hand brake lever 87, the forward end of the brake shoe assembly J, will engage the brake drum 57 and due to the brake drum 57 moving in the direction of the arrow 98, the brake shoe assembly J will move in unison with the brake drum 57 in the direction of the arrow 98 until the semi-circular surface 90 of the member 52, of the front end of the brake shoe assembly J, engages the anchor pin 35. It will now be noted that the link 72 will be held stationary, its ends 77 engaging the end of the member 52 which is held against the anchor pin 35 by the engagement of brake shoe assembly J with the brake drum 57. The lower arm 70, of the double end lever 65, will now fulcrum about the pin 73, thus causing the pin 61, together with the rear end of the shoe assembly J to move backward into engagement with the brake drum 57.

It is to be noted that the operation of the hydraulic system will not be affected by the slight relative movement of the parts of the hydraulic wheel cylinder G during the operation of the brake shoe assembly J by the emergency hand brake operation.

It is to be noted that the installation of the brake mechanism as disclosed in Figs. 3, 4 and 5 will provide approximately greater leverage when going backward.

It is also to be noted that with the installation of the brake as disclosed in Figs. 3, 4 and 5, the upper arm 66, of the double end lever 65, will provide a position for the pin 69 and yoke 67 which will tend to practically neutralize the vertical movement of said pin 69 and yoke 67 when the motor vehicle, to which the brake is attached, is moving forwardly or rearwardly along a highway.

Figs. 8, 9, 10 and 11 disclose an installation of the brake shoe assembly J having its end members 52 and 58, together with its anchor pin 35, assembled approximately at the upper side of the wheel brake assembly E and in a position ahead of the vertical center line of the wheel brake assembly E. In this installation the construction of the various parts of the brake mechanism is similar to those disclosed in Figs. 3, 4, 5 and 6 with the exception that the double arm lever 99 is pivotally supported and fulcrums about the pin 100 which connects the yoke 53 of the piston 51, to the member 58, which is attached to the forward end of the brake assembly J, the members 58 being provided with the semi-circular surface 91 for contacting the anchor pin 35. The member 58 is secured to the web 101 of the brake shoe 55, the web 101 extending for only a short distance beyond the members 58. The lower arm 102 of the double arm lever 99 here constitutes the longest lever portion of said lever 99 instead of the upper portion 66 of the double arm lever 65 as disclosed in Figs. 3, 4, 5 and 6. The double arm lever 99 is provided with the yoke portions 103, for engaging the pin 104 which fastens said yoke portions 103 to the link 72, the short lever portion here being the upper lever portion of the double arm lever 99. The double arm lever 99 is provided with the yoke portions 105 for extending around the yoke portion 53 of the piston 51. The link 72 is further provided with the member 106 which is suitably fastened to the link 72 by welding or other means so that the opening 107 between the arms 76 is closed at both of its ends, the member 106 being provided with the semi-circular surface 108 for engaging the anchor pin 35. It is to be noted that the member 106 will thus extend around the anchor pin 35 and prevent the link 72 from falling down to a position from where it would be unable to return to its proper position with its ends 77 between the members 52 and 58, when the brake shoe assembly J is operated by the pressure of the liquid of the hydraulic system and the front end of the brake shoe assembly J, together with its member 58, is moving away from the anchor pin 35.

Fig. 8 discloses the brake shoe assembly J in a disengaged or neutral position relative to the brake drum 57.

In Fig. 9, when the lower arm 102 is moved forwardly, the forward end of the brake shoe assembly J will be moved to engage the brake drum. The spring 89 tends to hold the rear shoe end 52 against the anchor pin 35 and thus the link 72 will be anchored by the lugs 77 against the shoe end 52 so the lever 102 will fulcrum about the pin 104 and move the pin 100 and bracket 58 forward and so apply the lining 56 against the drum 57.

In the installation as disclosed in Fig. 9, with the brake drum 57 revolving in the direction of the arrow 109, the leverage ratio of the operating mechanism in the wheel brake assemblies will be approximately four to one.

In Fig. 10, the initial engagement of the brake shoe assembly J, when the brake drum is revolving in the direction of the arrow 110, corresponding to the rearward or reverse movement of the motor vehicle, will cause the brake drum 57 and the brake shoe assembly J to move in unison until the semi-circular surface 91 of the member 58 is securely held against the anchor pin 35, then the link 72 will be caused, by the forward movement of the lever arm 102, to force the rear end of the brake shoe assembly J to engage the brake drum 57, the front end of the brake shoe assembly J being securely anchored against the anchor pin 35.

In the installation as disclosed in Fig. 10, with the brake drum 57 revolving in the direction of the arrow 110, the leverage ratio of the operating mechanism will be approximately three to one. The grommet 111 may be suitably mounted around the double arm lever 99 and in an opening in the backing plate 113 to exclude any foreign matter from entering the brake shoe operating space, the grommet 111 being preferably made of some resilient material, such as rubber composition, to allow the double arm lever 99 to move about slightly as the double arm lever 99 follows the movement of the brake shoe 55.

It is to be further noted that in Figs. 8, 9 and 10, the members 52 and 58 have been transposed in their positions relative to the anchor pin 35, the member 58 in said views in Figs. 8, 9 and 10 being disclosed as being provided with the adjusting mechanism F.

I claim:

1. In a brake, the combination of a brake shoe member, a hydraulic cylinder mounted on the ends of said brake shoe member, a double arm lever member pivotally mounted on said hydraulic cylinder, an anchor pin engaging the ends of said brake shoe member, a member slidably mounted adjacent said anchor pin, said last mentioned member engaging said anchor pin together with the ends of said brake shoe member, and operating means connected with said double arm lever member.

2. In a brake, the combination of a brake shoe member, a hydraulic wheel cylinder, a pin for connecting said hydraulic wheel cylinder with said brake shoe member, a double arm lever pivotally mounted on said pin, a slidably mounted link member pivotally connected with said double arm lever, said slidably mounted link member having portions engaging the ends of said brake shoe member, and operating means connected to one of the arms of said double arm lever.

3. In a brake, the combination of a brake shoe, a hydraulic wheel cylinder having its ends connected with said brake shoe, a member slidably mounted within said brake shoe, and means for moving said last mentioned member, said last mentioned member thereby expanding said brake shoe, said last mentioned member being connected with said hydraulic wheel cylinder.

4. In a brake, the combination of a brake shoe, an anchor pin engaging the ends of said brake shoe, said anchor pin being located off the vertical center of said brake shoe, hydraulic means for operating said brake shoe, said hydraulic means having oppositely disposed ends pivotally connected to the ends of said brake shoe, and hand controlled means for operating said brake shoe, said hand controlled means comprising means located between and engaging the ends of said brake shoe.

5. In a brake, the combination of a brake shoe, a hydraulic wheel cylinder, a lever member provided with a plurality of arms, said lever member being pivotally connected with said hydraulic wheel cylinder, one of the arms of said lever member being provided with an elongated opening therein, a slidable member for expanding said brake shoe, said last mentioned slidable member being connected with the elongated opening of said lever member, and means for operating said lever member.

6. In a brake, the combination of a brake shoe, a backing plate member suitably mounted adjacent said brake shoe, an anchor member mounted in said plate member, said anchor member engaging both of the ends of said brake shoe, and a resilient spider member suitably mounted on said anchor pin, said resilient member having arms for engaging both of the ends of said brake shoe, said resilient member forcing said brake shoe member against said backing plate member.

7. In a brake, the combination of a brake shoe suitably anchored and a rectangular shaped member engaging said brake shoe, said rectangular shaped member being provided with a plurality of resilient leg portions at each of its ends for exerting a thrust on said brake shoe in a transverse direction relative to said brake shoe.

8. In a brake, the combination of a hydraulic wheel master cylinder provided with a plurality of yoke portions and a lever member pivotally mounted in one of the yoke portions of said hydraulic wheel master cylinder, said lever member being provided with a pair of lever arms, and a slidably mounted member connected with one of the lever arms of said member.

9. In a brake, the combination of a brake shoe, a hydraulic wheel master cylinder pivotally connected to said brake shoe, a lever member pivotally connected to said hydraulic wheel master cylinder, and a slidably mounted member pivotally connected to said lever member.

10. In a brake, the combination of a hydraulic wheel master cylinder provided with a conduit member for guiding the hydraulic liquid thereto, said conduit member being suitably secured at the outside of one of the ends of said hydraulic wheel master cylinder, and a double arm lever member pivotally mounted in said conduit member of said hydraulic wheel master cylinder, a brake shoe, and means for expanding said brake shoe, said means being operatively connected with said lever member.

11. In a brake, the combination of an anchor pin, a brake shoe having both of its ends engaging said anchor pin, a slidably mounted member adapted to engage the ends of said brake shoe, manually operated means for actuating said slidably mounted member with a longitudinal movement to move one of the ends of said brake shoe away from said anchor pin, and hydraulically operated means for actuating said brake shoe, said hydraulically operated means being operatively connected with said slidably mounted member and operating said slidably mounted member with a longitudinal movement.

12. In a brake for a vehicle wheel, the combination of an anchor member suitably mounted, a brake suitably mounted and provided with a pair of ends engaging said anchor member, means for moving one only of the ends of said brake shoe from said anchor member when the vehicle wheel is revolving in one direction, said means being further adapted to move the opposite end only of said brake shoe from said anchor member when the vehicle wheel is revolving in a direction opposite to said first mentioned direction, said means comprising a pivotally mounted member operatively connected with a slidably mounted member.

13. In a brake, the combination of a backing plate suitably mounted, a brake shoe suitably mounted adjacent said backing plate, a hydraulically operated cylinder suitably connected at one of its ends to said brake shoe, a conduit member suitably connected with the other end of said hydraulically operated cylinder, said conduit member extending through said backing plate, said conduit member being provided with a pair of fork portions, one of said fork portions being connected with said brake shoe, a double arm lever suitably mounted in the other fork portion of said conduit member, a slidably mounted member for engaging the ends of said brake shoe, said slidably mounted member being operatively connected with said double arm lever, and means for operating said double arm lever.

14. In a brake, the combination of a backing plate suitably mounted, a brake shoe suitably mounted adjacent said backing plate, an anchor pin suitably mounted and engaging the ends of said brake shoe, a slidably mounted member for engaging both of the ends of said brake shoe, said slidably mounted member further engaging said anchor pin, a double end lever suitably mounted and having each of its lever portions located on opposite sides of said backing plate, and means for operating said double end lever.

15. In a brake, the combination of a brake shoe, a backing plate mounted adjacent said brake shoe, an anchor pin suitably mounted and engaging said brake shoe, said anchor pin being provided with a projection, and a resilient member provided with an opening engaging the projection of said anchor pin to prevent said resilient member from turning relative to said anchor pin, said resilient member being provided with arms for engaging said brake shoe to force said brake shoe toward said backing plate.

16. In a brake, the combination of a brake shoe suitably anchored, a member slidably mounted adjacent the side of said brake shoe, said member being provided with a right angularly extending portion for engaging each of the ends of said shoe, a pivotally mounted member operatively connected with said first mentioned member to move said first mentioned member to operate said brake shoe, and hydraulically actuated means for actuating said brake shoe, said hydraulically operated mechanism being operatively connected with said pivotally mounted member.

17. In a brake for a vehicle wheel, the combination of an anchor member suitably mounted, a brake suitably mounted and provided with a pair of ends engaging said anchor member, means for moving one only of the ends of said brake shoe from said anchor member when the vehicle wheel is revolving in one direction, said means being further adapted to move the opposite end only of said brake shoe from said anchor member when the vehicle wheel is revolving in a direction opposite to said first mentioned direction, and hydraulically operated means for actuating said first mentioned means to move both of the ends of said brake shoe from said anchor member, said hydraulically operated means being operatively connected with said first mentioned means.

18. In a brake, the combination of an anchor pin fixed against movement and provided with a fixed cylindrical portion, a brake shoe engaging the cylindrical portion of said anchor pin, a member extending fully around said anchor pin and engaging the ends of said brake shoe, said member being adapted to slidably contact the cylindrical portion of said anchor pin and move substantially in a plane extending transversely to the axis of said anchor pin, and a lever mechanism pivotally attached to an end of said member.

19. In a brake, the combination of a brake shoe, an anchor member engaged by both ends of said brake shoe, hydraulic means for operating said brake shoe, and hand operated means for operating said brake shoe and comprising a member movably mounted relative to said anchor member and operatively connected with said hydraulic means, the operation of said hydraulic means causing said member movably mounted relative to said anchor member to slidably move longitudinally to operate said brake shoe.

20. In a brake, the combination of a brake shoe, a member for expanding said brake shoe and engaging the ends of said brake shoe, a second member pivotally mounted and operatively connected to one end of said first mentioned member, manually operated means for operating said second member, and hydraulic means operatively connected with said second member to operate said first mentioned member through said end operatively connected with said second member.

JOHN W. TATTER.